(12) United States Patent
Biskup et al.

(10) Patent No.: US 10,245,673 B2
(45) Date of Patent: Apr. 2, 2019

(54) MIG/MAG WELDING OF CARBON STEEL WITH ROTATING ARC AND AR/HE/O₂ GAS MIXTURE

(75) Inventors: Laurent Biskup, Houston, TX (US); Gilles Boudet, Houston, TX (US); Jean-Pierre Planckaert, Houston, TX (US); Michel Saez, Houston, TX (US)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 889 days.

(21) Appl. No.: 13/808,777

(22) PCT Filed: Jul. 4, 2011

(86) PCT No.: PCT/FR2011/051560
§ 371 (c)(1),
(2), (4) Date: Jan. 7, 2013

(87) PCT Pub. No.: WO2012/004498
PCT Pub. Date: Jan. 12, 2012

(65) Prior Publication Data
US 2013/0112662 A1    May 9, 2013

(30) Foreign Application Priority Data
Jul. 7, 2010  (FR) ...................................... 10 55493

(51) Int. Cl.
*B23K 9/173*  (2006.01)
*B23K 9/02*   (2006.01)
*B23K 9/028*  (2006.01)
*B23K 9/08*   (2006.01)
*B23K 35/38*  (2006.01)
(Continued)

(52) U.S. Cl.
CPC .............. *B23K 9/173* (2013.01); *B23K 9/028* (2013.01); *B23K 9/0216* (2013.01); *B23K 9/08* (2013.01);
(Continued)

(58) Field of Classification Search
CPC ........ B23K 9/0216; B23K 9/028; B23K 9/08; B23K 9/173; B23K 35/383
(Continued)

(56) References Cited

U.S. PATENT DOCUMENTS 4,258,242 A * 3/1981 Fujimori ................ B23K 9/188
219/137 R
4,749,841 A * 6/1988 Galantino ................ B23K 9/09
219/137 PS
(Continued)

FOREIGN PATENT DOCUMENTS

AU    461775    6/1975
DE    4429228   8/1995
(Continued)

OTHER PUBLICATIONS

FR 1055493, French Search Report, dated Mar. 3, 2011 (5 pages).
(Continued)

*Primary Examiner* — Phuong T Nguyen
(74) *Attorney, Agent, or Firm* — Elwood L. Haynes

(57) ABSTRACT

The invention relates to a ternary gaseous mixture formed from argon, helium and oxygen, characterized in that it is formed from between 19.5 and 20.5% of helium, between 2.7 and 3.3% of Oi, and argon for the remainder (volume %), and to the use thereof as gaseous protection in a method of electric arc welding of at least one steel part to carbon, using a fusible filler wire. Preferably, the welded parts overlap or cover each other and the rotary arc welding takes place where the parts overlap.

10 Claims, 1 Drawing Sheet

(51) Int. Cl.
*B23K 101/12* (2006.01)
*B23K 103/04* (2006.01)

(52) U.S. Cl.
CPC ........ *B23K 35/383* (2013.01); *B23K 2101/12* (2018.08); *B23K 2103/04* (2018.08); *B23K 2103/05* (2018.08)

(58) Field of Classification Search
USPC .............. 219/60 A, 60 R, 74, 76.14, 121.11, 219/121.33, 137.2, 137.9, 125.12
See application file for complete search history.

(56) References Cited

U.S. PATENT DOCUMENTS

2006/0243704 A1  11/2006 Matz
2009/0236319 A1* 9/2009 Matz ..................... B23K 9/08
                                                    219/74

FOREIGN PATENT DOCUMENTS

| DE | 19704513   | 3/1998  |
| DE | 102007013802 | 9/2008  |
| EP | 1707296    | 10/2006 |
| EP | 2042256    | 4/2009  |
| EP | 2078580    | 7/2009  |

OTHER PUBLICATIONS

PCT/FR2011/051560, International Search Report and Written Opinion, dated Mar. 3, 2011 (Search Report Translated) (12 pages).

* cited by examiner

MIG/MAG WELDING OF CARBON STEEL WITH ROTATING ARC AND AR/HE/O₂ GAS MIXTURE

CROSS-REFERENCE TO RELATED APPLICATIONS

This application is a § 371 of International PCT Application PCT/FR2011/051560 filed Jul. 4, 2011, which claims § 119(a) foreign priority to French patent application 1055493, filed Jul. 7, 2010.

FIELD OF THE INVENTION

The invention relates to the use of a ternary gas mixture formed of argon, helium and oxygen as shielding gas in an arc welding process with a rotating arc, in particular a MIG/MAG welding process, with provision of consumable wire, carbon steel parts, in particular in overlap type configuration, especially joggled lap joints.

The joints of metal parts in overlap type configuration (denoted by the expression lap joints) are especially found in the constituent components of pressure vessels of the following types: hot water tanks, extinguishers, compressors, refrigeration devices, LPG gas cylinders, etc.

In particular, the most widely used are those said to have joggled edges, commonly referred to as joggled lap joints. As illustrated in FIG. 3, such a joint in general comprises two parts having hollow cylindrical ends, one of which is nested in the other so that the inner surface of one of the parts overlaps, over several millimeters, the outer surface of the other part at their circular ends.

The standard EN 13445-4:2002 precisely defines the manufacturing tolerances relating to the alignment of neutral fibers, the alignment of surfaces, deviations from circular form, deviations from straightness, profile irregularities and local thinning of such lap joints, in particular joggled lap joints.

Schematically, the weld obtained on this type of joint, that is to say with edges that partially overlap or cover each other, as illustrated in particular in FIG. 3, must have a relatively wide profile in order to thoroughly cover the outside of the joint and have a sufficient penetration in order to melt the lower shoulder of the upper edge.

Furthermore, as a function of the welding process used, after each pass, the slag that is formed during the preceding pass must be removed, the surface cleaned and the surface defects removed in order to obtain the desired weld quality.

Document EP-A-2078580 proposed to weld joggled lap joints by a MIG/MAG welding process with rotating arc and using a gas mixture consisting of 8 to 12% of helium, of 2.5 to 3.5% of oxygen and of argon for the remainder (% by volume).

However, this process has the drawbacks of leading to an insufficient arc constriction which results in welds whose penetration profile is not always the one desired.

In the targeted applications, the user will seek a transfer with a minimum of spatter. However, the mixture proposed in document EP-A-2078580 makes it necessary to use a higher voltage in order to be 100% free of extremely brief but intense short-circuits.

Furthermore, document EP-A-857534 teaches the use of gas mixtures consisting of 10 to 40% of helium, of 1 to 8% of oxygen and of argon for the remainder for welding ferromagnetic steels. Advantageously, the recommended oxygen content should be at least 5% in order to obtain effective welding in the case of rotating arc welding.

However, in this case, the joints are all in conventional configuration, that is to say square butt joints. This document does not teach anything regarding lap joints, nor regarding the weld quality obtained on such joints.

However, lap joints are tricky to weld and pose specific problems since if the welding energy is too high, significant spatter of molten metal occurs, which damages the production quality, or even piercings of the welded parts occur if the thickness of the welded parts is small, that is to say less than 1 mm approximately.

Furthermore, the weld or weld seam produced on joints of this type must be of high quality not only in terms of penetration in order to enable a firm attachment together of the overlapping parts but also in terms of bead morphology, in particular of wetting, so that the bead obtained is not too rounded or conversely it does have an undercut.

However, obtaining a good bead appearance requires is not easy from an industrial viewpoint.

Starting from here, one problem which is faced is to propose an improved rotating arc welding process that makes it possible to effectively weld lap joints in steel so as to obtain a good penetration and a good welding quality, especially a good morphology of the weld bead, in particular in terms of wetting, with no spatter or else as little as possible spatter during the welding, and this with use of a low welding energy, typically a welding current of less than 300 A with a welding voltage of less than 35 V.

Another related problem is to moreover propose a specific gas mixture that is particularly suitable for such a process of welding lap joints in steel, in particular joggled lap joints, which are suitable for use at a low energy level, that is to say with a welding current of less than 300 A with a welding voltage of less than 35 V.

SUMMARY OF THE INVENTION

The solution of the invention relates to a ternary gas mixture formed of argon, helium and oxygen, characterized in that it consists of 19.5 to 20.5% of helium, 2.7 to 3.3% of $O_2$ and of argon for the remainder (% by volume).

Depending on the case, the gas mixture of the invention may comprise one or more of the following characteristics (% by volume):
  it contains from 19.8 to 20.2% of helium.
  it contains from 2.8 to 3.2% of $O_2$.
  it contains from 2.9 to 3.1% of $O_2$.
  it consists of 20% of helium, 3% of $O_2$ and of argon for the remainder.
  it is pre-packaged in a gas reservoir, in particular in gas cylinders.
  it is produced in situ by means of a gas mixer that is used to mix the argon, helium and oxygen in the desired volume proportions.

Furthermore, the invention also relates to a process for the electric-arc welding of at least one carbon steel part with use of a consumable filler wire and of gas shielding, characterized in that the gas shielding is formed of a ternary gas mixture according to the invention.

Depending on the case, the welding process of the invention may comprise one or more of the following characteristics:
  it is of MIG/MAG type.
  the consumable filler wire is melted by the arc so as to obtain metal transfer by rotating liquid vein.
  the welded part or parts overlap or cover one another, the rotating arc welding taking place at said overlap or covering up.

- the welded parts are in a joggled type configuration, preferably the welded parts are constituent components of a pressure vessel of the hot water tank, extinguisher, compressor, refrigeration device or gas cylinder type.
- the welded parts comprise cylindrical ends that overlap one another.
- use is made of an arc voltage between 29.5 V and 35 V, preferably less than 34 V.
- one or more parts having a thickness less than or equal to 3 mm, preferably less than or equal to 2 mm, is (are) welded.
- the wire has a diameter of 0.8 to 1 mm.
- the arc is a rotating arc or the vein of liquid metal is rotating, that is to say driven by a rotational movement.
- the transfer takes place by a vein of liquid metal, i.e. molten metal. The vein of liquid metal is formed by melting the consumable filler wire within the electric arc.
- the welded parts are made of carbon steel. The expression "carbon steel" refers to an iron-carbon alloy with a carbon concentration of less than 2% by weight. Such an alloy may contain additional elements of Mn, Cr, Si, Mo, Ti, Ni and Nb type. Impurities may be present in the chemical analysis of the metal, such as S, P, O, N, H.
- the welding voltage is less than 36 V, typically between 29.5 V and 35 V approximately.
- the welding intensity is between 245 A and 300 A.
- the welding wire is of NERTALIC 70 S type.
- the wire feed rate (Vwire) is at most 30 m/min, typically between 16 m/min and 20 m/min.
- the welding speed is at most 5 m/min, typically between 0.8 m/min and 2 m/min.

The present invention will be explained in greater detail in the following description given with reference to the appended figures, among which:

DETAILED DESCRIPTION OF THE INVENTION

Figure 1:
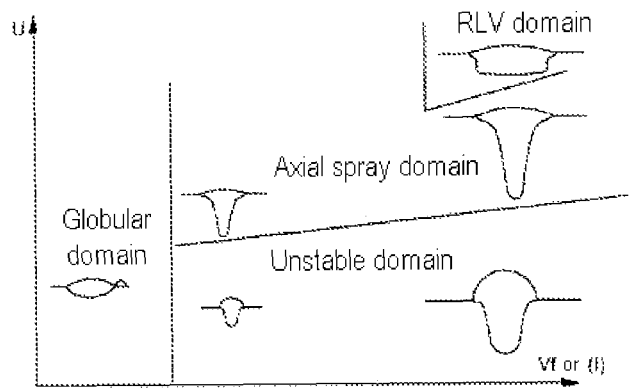
FIG. 1 schematically shows the influence of the type of transfer on the morphology of the bead,
FIG. 2 schematically shows a rotating liquid vein, and
FIG. 3 schematically shows a joggled lap joint.

Generally, in MIG-MAG arc welding, there are three main or conventional transfer regimes, namely:

short-circuit. This regime is obtained for low arc energies, typically from 50 to 200 A and from 15 to 20 V. A drop of molten metal forms at the end of the filler wire and gradually enlarges until it comes into contact with the pool of molten metal, which causes a short circuit. The current then increases rapidly making a pinching appear which facilitates the detachment of the drop, then the arc reignites. This phenomenon is repeated at frequencies of 50 to 200 Hz approximately. This regime is said to be "cold" and has a short arc. It is suitable for the welding of fine thicknesses, namely less than 3 mm, and makes it possible to control the molten pool during position welding.

axial spray. For high welding energies, that is to say of at least 28 V for 280 A, and above a certain current density, typically greater than 250 A/mm$^2$ depending on the nature of the wire and the shielding gas, the end of the filler wire takes on an elongated cone shape. The transfer of the molten metal from the wire to the weld pool takes place in the form of fine droplets of molten metal, the diameter of which is less than that of the wire and which are sprayed at high speed in the axis of the wire. The arc is 4 to 6 mm long. This metal transfer provides a stable arc and little spatter. It allows high penetrations, namely of at least 5 mm, and large volumes of deposited metal, that is to say at least 15 m/min of wire rate. It is suitable for the welding of parts that have thicknesses of the order of 5 mm and above. However, the volume and the fluidity of the pool mean that it is mainly used in downhand welding.

globular regime. For welding energies between those giving short-circuit transfer and axial spray transfer, that is to say typically between 22 V for 200 A and 28 V for 280 A, the drops of metal that form at the end of the filler wire have a slow growth. Since the intensity of the current is not sufficient to have a pinching effect that gives rise to the detachment, the drop becomes large, that is to say having a size greater than the diameter of the wire in question. The transfer takes place either by a short-circuit, when the drop touches the pool, or by detachment of the drop under the effect of gravity. The drop then follows a trajectory which is not always in the axis of the arc. This mode of transfer is unstable, makes it possible to obtain only low welding penetrations and generates much spatter of metallic droplets.

It is necessary to add, to these three main regimes, three transfer regimes which necessitate unconventional welding parameters, namely:

the forced short arc regime. The short-circuit transfer does not make it possible to weld at high current, whereas an increase of the welding intensity leads to a globular transfer generating considerable adherent spatter and an equally considerable finishing time. Forced short-circuit or forced short-arc transfer makes it possible, with an arc energy normally located in the globular range, to maintain a transfer by short-circuit. This regime makes it possible to increase the welding speeds and generates only fine spatter limiting the finishing time. Forced short-circuiting is obtained with transistorized welding machines, the waveforms of which make it possible to maintain a regular short-circuit.

the pulsed regime. Originally, the pulsed regime was developed to overcome the drawbacks of the globular regime which, due to its unstable transfer mode and its spattering nature, did not make it possible to increase productivity under acceptable welding conditions. In pulsed regime, welding is carried out with a pulsed current, by choosing the pulsation parameters so that there is, for each of the pulses, a transfer of axial spray type with a single drop per pulse. The regime here is forced, that is to say that the form of the current is imposed by carefully choosing the pulsation parameters so that the result is conclusive. Typically, the pulsation frequencies range from 50 to 300 Hz depending on the wire feed rate. This requires generators, transistor generators for example, for which it is possible to impose the form of the current as a function of time.

transfer by rotating liquid vein (or RLV). At very high welding energies, that is to say around 40 V for 450 A, axial spray transfer is subjected to high electromagnetic forces. Under the effect of these forces, the liquid metal being transferred starts rotating forming a rotating liquid vein. Giving a high productivity, this regime appears at intensities of the order of 500 A and voltages of 45 to 50 V. The rounded penetration shape is favorable to groove filling and enables good compactness.

However, generally, the transfer depends on the wire rate and on the voltage. If the wire rate is high enough, the transfer changes from unstable to axial spray, then onto rotating liquid vein, by increasing the voltage. The shape of the bead then results from the transfer applied.

The morphologies of beads obtained with the various aforementioned transfer modes are illustrated in FIG. 1. As can be seen in FIG. 1, each transfer leads to a particular bead shape.

Thus:
the globular regime is expressed by a lenticular penetration with presence of large adherent spatters.
the unstable regime is characterized by a curved, unwetted bead, with a slightly pointed penetration for low wire rates. The pointed shape becomes more pronounced with increasing wire rate.
the pulsed regime makes it possible to have bead morphologies of various types, owing to the large range of adjustments that its waveforms offer. At high wire rates, the obligation to greatly increase the frequency of the current pulses and also the peak intensity results in behavior very close to spray. This transfer is expressed at the bead by a geometry very close to that which smooth current spray transfer provides.
the axial spray regime results in a thimble-shaped penetration that is even more pronounced when the wire rate is high. The wetting is good.
the rotating liquid vein or RLV generates dish-shaped flat-bottomed bead penetrations.

Within the context of the present invention, the chosen transfer mode is the transfer of rotating liquid vein or RLV type.

However, conventionally, in RLV transfer, for very high welding energies, that is to say of at least 40 V for 450 A, and under the effect of the electromagnetic forces present, the formation of a liquid vein that has a rotating movement is observed.

This RLV regime therefore generally requires the use of a high voltage-current pair, i.e. greater than 40 V and 450 A, delivered by one (or more) power generators, the power envelope of which covers this energy range, given that commonly generators are found that do not deliver more than 400 A, and of a wire rate between 20 and 40 m/min as a function of the diameter of filler wire used, which wire must in addition always have a free terminal part of at least 25 mm. In order to do this, use is customarily made of a double-speed feeder, namely having speeds that may reach 50 m/min, which makes it possible, in a first regime at conventional wire rate, to ensure the smooth running of the startup and shutdown phases, and in a second regime, to allow passage to the high deposition rate regime which requires high wire rates.

Furthermore, the welding nozzle delivering the wire and the gas shielding must be particularly well cooled by circulation of water.

Finally, the gas shielding applied during MIG/MAG welding in RLV regime is particularly important since it determines the obtaining of welding beads of better or worse quality. Thus, document EP-A-2078580 proposed a preferential He/Ar/$O_2$ mixture containing from 9% to 11% of helium, from 2.7% to 3.3% of oxygen and the remainder being argon. However, in practice, it turned out that this ternary mixture was not ideal since the low content of helium struggles to create an arc constriction sufficient to increase the current density and therefore the amplitude of the electromagnetic forces. Furthermore, the observation of oscilloscope recording with very rapid sampling has shown the existence of micro short-circuits at the bottom of the rotating liquid vein zone on the diagram of FIG. 1. These are in fact points of operation where the voltage is not high enough to prevent the liquid vein from establishing physical contact with the weld pool and therefore causing extinction of the arc followed by reignition accompanied by spatter.

In view of this, the inventors of the present invention have sought to better understand the advantage and the influence of various gases being incorporated into the gas mixture composition that is used for the shielding gas so as to attempt to improve the process for the MIG/MAG welding of steel parts with transfer by rotating liquid vein but at low energy level, that is to say less than 320 A and 32 V.

They were very particularly interested in helium and oxygen, but also in argon, and carried out the comparative tests recorded below.

In fact, in such a gas mixture, the helium is used for its greater thermal conductivity. Indeed, it is possible to consider that for any position along the axis between the wire and the part to be welded, a large part of the electrical energy provided by the source is contained in the enthalpy of the plasma given that a portion of the shielding gas is ionized in order to form the electric arc, namely: $IV \approx \rho_A h_A v_A A$ where:
I is the welding current,
V is the potential difference between the electrode and the projection following the axis of the wire to the part to be welded,
$\rho_A$ is the average density of the plasma,
$v_A$ is the average velocity of the plasma, and
A is the surface area of the arc.

The energy flux density is then given by $\rho_A h_A v_A$, therefore one essential material characteristic of the plasma is the product $\rho h$ or $\rho c_p$ since: $c_p = dh/dT$.

According to the above equation, for the same values of I and V, an increase of the value of $c_p$ and therefore of the enthalpy h results in a reduced surface area of the arc A and therefore in a constricted arc.

A second effect is that the reduced surface area of the arc produces a higher current density and therefore larger magnetic forces.

It is also possible to note that a higher velocity $v_A$ produces a smaller value of A and a constricted arc. This effect is called the thermal "pinch" effect.

Furthermore, the oxygen is used for its stabilizing effect on the arc but also for the surface-active aspect which will make it possible to obtain a liquid vein at the end of the consumable wire that will have a greater fluidity and that will be moved more easily by the magnetic forces.

Finally, the role of the argon is itself to facilitate the ignition of the arc since it ionizes easily.

Figure 2:
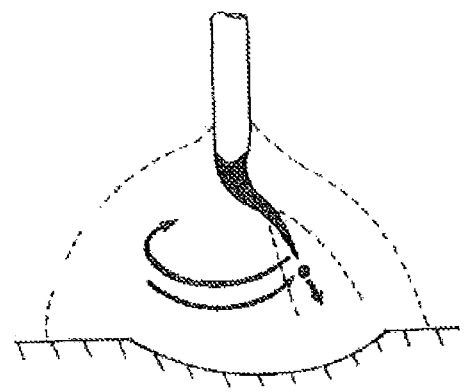

Ultimately, the targeted objective was to succeed in obtaining, during the MIG/MAG welding of overlapping steel parts, typically a joggled configuration, an RLV transfer identical or similar to that shown schematically in FIG. 2, at a low energy level.

In order to do this, the following were tested:
various gas compositions, in particular ternary Ar/He/$O_2$ mixtures containing:
either from 10 to 40% He with a constant $O_2$ content (3%), the remainder Ar,
or from 2 to 6% $O_2$ with a constant He content (10%), and the remainder being Ar, or other comparative mixtures with 20% He,
various wire rates, and
various electrical parameters, in particular various voltages.

For each welded bead, a rapid video synchronized with the recording of the electrical welding parameters and of the macrographs was carried out so as to be able to observe the manner in which the transfer and the appearance of micro short-circuits at the bottom of the rotating liquid vein zone (cf. FIG. 1) takes place. These are operating points where the voltage is not high enough to prevent the liquid vein from establishing physical contact with the weld pool and therefore causing an extinction of the arc followed by a reignition accompanied by spatter.

Indeed, to be able to avoid physical contact between the vein and the weld pool is of prime importance in order to be able to prevent or reduce spatter, and therefore to increase the welding quality.

The welding parameters which were used for the tests are listed in Table 1.

TABLE 1

Welding parameters

| Grade of base metal (steel) | Thickness welded (mm) | Grade of wire | Wire diameter (mm) | Wire feed rate (Vwire) (m/min) | Voltage U (V) | Intensity I (A) | Welding speed Vs (cm/min) |
|---|---|---|---|---|---|---|---|
| A42 | 6 | 70S | 1 | 16 to 20 | 29 to 35 | 245 to 295 | 77 |

Steel A42 = Steel P265 according to the standard EN 10028-2.
Grade of wire: Nertalc 70S, according to the standard AWS A 5-18: ER 70S-3 and according to the standard EN440: G2 Si.

The compositions of the various gas mixtures tested are recorded in Table 2.

Figure 3:
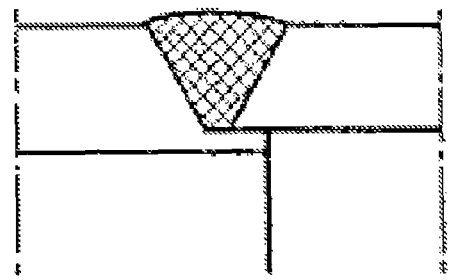

During the welding, the parts welded are in joggled configuration as illustrated in FIG. 3.

Furthermore, the generator used is of Digi@wave 500 type from Air Liquide Welding France; the feeder is of DVR 500 type; and the torch is of PROMIG 441 W type.

TABLE 2

Compositions of the gas mixtures tested

| Test No. | $O_2$ content (% by vol.) | He content (% by vol.) | Ar content (% by vol.) |
|---|---|---|---|
| 1 | 3 | 10 | Remainder |
| 2 | 3 | 20 | (balance to |
| 3 | 3 | 30 | 100 vol %) |
| 4 | 3 | 40 | |
| 5 | 6 | 10 | |
| 6 | 4.5 | 10 | |
| 7 | 2 | 10 | |
| 8 | 2 | 20 | |

The results obtained made it possible to demonstrate the influence of oxygen and helium in MIG/MAG welding with rotating arc (RLV).

More specifically, tests 7 and 8 showed that, for an $O_2$ content of 2%, the welding energy required to obtain a metal transfer free of micro short-circuiting is located at 32.8 V for 280 A. The low $O_2$ content of the shielding gas increases the fluidity of the molten metal less and therefore makes it less capable of rotating.

When the $O_2$ content reaches 3% (tests 1 to 4), the welding energy required in order to obtain a metal transfer free of micro short-circuiting is located at 31.8 V for 275 A, whereas for 4.5% (test 6), it is located at 32.8 V for 279 A. The increase in the $O_2$ content of the shielding gas increases the fluidity of the molten metal and therefore the liquid vein lengthens. This longer (wire) or vein of liquid metal therefore randomly touches the weld pool and creates short circuits which give rise to adherent spatters. It is therefore decidedly preferable to use an oxygen content of the order of 3% rather than a lower content, that is to say of only 2%.

For an $O_2$ content of 6% (test 5), the welding energy required to obtain a metal transfer free of micro short-circuiting is located at 34.4 V for 283 A. The high $O_2$ content of the shielding gas increases the fluidity of the molten metal even more and therefore the liquid vein lengthens more. The short-circuits are more frequent and therefore the spatters are more numerous. In addition, the bead has a very marked oxidation and the presence of bulky silicates at the surface of the bead is noted, which would be unacceptable from the point of view of bead quality and appearance. This oxygen content of 6% is hence excessive.

Additional tests carried out with oxygen contents greater than 3% but less than 6% made it possible to observe that oxygen contents greater than around 3% were not necessary in order to obtain good wetting and that, on the contrary, those above 4.5 or 5% were able to damage the quality of the bead.

Finally, the oxygen content must therefore imperatively be maintained at around 3% by volume.

Furthermore, additional tests have shown that, when the gas contains 10% helium (tests 1 and 5-7), the welding energy required to obtain a metal transfer free of micro short-circuiting is located at 31.8 V for 275 A.

The low content of helium struggles to create an arc constriction sufficient to increase the current density and therefore the amplitude of the electromagnetic forces. The metal transfer clearly takes place according to rotating liquid vein transfer but the macrographs show a penetration whose profile does not respect the definition of RLV transfer.

Increasing the helium content to 20% by volume (tests 2 and 8) results in a welding energy required for obtaining a metal transfer free of micro short-circuiting that is located at 31.8 V for 280 A. The metal transfer clearly takes place according to rotating liquid vein transfer and the macrographs show a penetration whose profile respects the definition of RLV transfer.

On the other hand, at more than 20% helium, in particular at 30% helium (test 3), the welding energy required to obtain a metal transfer free of micro short-circuiting is located at 34.4 V for 276 A. The constriction of the arc increases the energy density at the center of the arc and therefore excessively fluidifies the rotating liquid vein which creates parasitic short-circuits.

More notably still, at 40% helium (test 4), the welding energy required to obtain a metal transfer free of micro short-circuiting is located at 34.4 V for 273 A. The constriction of the arc increases the energy density at the center of the arc and therefore excessively fluidifies the rotating liquid vein which creates short circuits. In addition, the greater current density increases the amplitude of the electromagnetic forces and therefore increases the instability of the metal transfer which will greatly modify the geometry of the arc during the welding. This phenomenon results in transverse oscillations of the bead.

Finally, the helium content must imperatively be maintained at around 20% by volume during the welding of a lap joint of carbon steel parts.

Additional tests about this value of 20% He made it possible to observe that the results are particularly good in a very narrow range, namely for He contents between 19.5 and 20.5% helium, when the oxygen content is furthermore of the order of 3% by volume, typically between 2.7 and 3.3% by volume.

Preferably, the He content is at least 19.7%, preferably at least 19.8%, more preferably still at least 19.9% and/or at most 20.3%, preferably at most 20.2%, more preferably still at most 20.1%.

Similarly, advantageously, the oxygen content is typically at least 2.8%, preferably at least 2.9%, and/or at most 3.2%, preferably at most 3.1%.

All of these tests make it possible to result in a specific Ar/He/$O_2$ ternary gas composition that is particularly well suited for the MIG/MAG welding with rotating arc of carbon steel parts in overlapping configuration or trough-type corner configuration, in particular joggled lap joints, namely a ternary Ar, He and $O_2$ gas mixture consisting of 20% of helium, of 3% of oxygen and of argon for the remainder (% by volume).

Indeed, a gas mixture according to this composition makes it possible to obtain a stable transfer by rotating liquid vein at low energy, without spatter and that has the expected bead morphology, in particular excellent wetting.

Indeed, the use of ternary mixtures where the helium content lies around 20% makes it possible to lower the energy level at which the RLV transfer is obtained in a stable manner since it makes it possible to increase the current density without however reaching a level which would give rise to the lengthening of the liquid vein (effect of magnetic pinching and higher isotherms) and would therefore create micro short-circuits.

Limiting the oxygen content of these ternary mixtures to 3% makes it possible to limit the surface-active effect of the gas and therefore also makes it possible not to have micro short-circuits and makes it possible not to have detachment of the end of the rotating liquid vein during the rotation. Indeed, these centrifugal spatters which appear for levels of $O_2>4.5\%$, fall outside of the weld pool and give rise to sizable adherent spatters.

Moreover, using a content of greater than 5% results in a bead appearance which may be considered to be insufficient for reasons of surface oxidation and presence of silicates.

The process of electric arc MIG/MAG welding with feeder wire and Ar/He/$O_2$ gas shielding according to the invention is particularly suitable for the welding of carbon steel parts, in particular when a surface oxidation of the bead can be tolerated.

The MIG/MAG welding process according to the invention is very suitable for the welding of joggled lap joints, in particular of water heater tanks, the bodies of extinguishers, tanks, etc.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the examples given above.

What is claimed is:

1. A process for the electric-arc MIG/MAG welding of at least two carbon steel parts with use of a consumable filler wire, a rotating arc and gas shielding formed of a ternary gas mixture consisting of 19.5 to 20.5% of helium, of 2.7 to 3.3% of $O_2$ and of argon for the remainder (% by volume), wherein the consumable filler wire is melted by the rotating arc so as to obtain metal transfer by rotating liquid vein and the at least two carbon steel parts overlapping or covering one another, the rotating arc welding taking place at said overlap or covering.

2. The process of claim 1, wherein the gas shielding is formed of a ternary gas mixture containing from 19.8 to 20.2% of helium.

3. The process of claim 1, wherein the gas shielding is formed of a ternary gas mixture containing from 2.8 to 3.2% of O2.

4. The process of claim 1, wherein the gas shielding is formed of a ternary gas mixture containing from 2.9 to 3.1% of O2.

5. The process of claim 1, wherein the gas shielding is formed of a ternary gas mixture consisting of 20% of helium, 3% of O2 and of argon for the remainder.

6. The process of claim 1, wherein the welded parts are in a joggled type configuration.

7. The process of claim 1, wherein the welded parts are constituent components of a pressure vessel of a hot water tank, extinguisher, compressor, refrigeration device or gas cylinder type.

8. The process of claim 1, wherein the welded parts comprise cylindrical ends that overlap one another.

9. The process of claim 1, wherein an arc voltage between 29.5 V and 35 V is used.

10. The process of claim 1, wherein the wire has a diameter of 0.8 to 1 mm.

* * * * *